Nov. 9, 1965    J. B. CATALDO ETAL    3,217,130
CIRCUIT INTERRUPTER CASING AND BASE
Filed July 27, 1962    9 Sheets-Sheet 1

INVENTORS
JOHN B. CATALDO
ANDREW J. KRALIK
FRANK W. KUSSY
ROBERT W. THOMAS
BY
OSTROLENK, FABER, GERB and SOFFEN
ATTORNEYS INVENTORS
JOHN B. CATALDO
ANDREW J. KRALIK
FRANK W. KUSSY
ROBERT W. THOMAS
BY
OSTROLENK, FABER, GERB and SOFFEN
ATTORNEYS Nov. 9, 1965  J. B. CATALDO ETAL  3,217,130
CIRCUIT INTERRUPTER CASING AND BASE
Filed July 27, 1962  9 Sheets-Sheet 3

INVENTORS
JOHN B. CATALDO
ANDREW J. KRALIK
FRANK W. KUSSY
ROBERT W. THOMAS

BY

OSTROLENK, FABER, GERB and SOFFEN
ATTORNEYS

Nov. 9, 1965  J. B. CATALDO ETAL  3,217,130
CIRCUIT INTERRUPTER CASING AND BASE
Filed July 27, 1962  9 Sheets-Sheet 5

INVENTORS
JOHN B. CATALDO
ANDREW J. KRALIK
FRANK W. KUSSY
ROBERT W. THOMAS
BY
OSTROLENK, FABER, GERB and SOFFEN
ATTORNEYS Nov. 9, 1965 J. B. CATALDO ETAL 3,217,130
CIRCUIT INTERRUPTER CASING AND BASE
Filed July 27, 1962 9 Sheets-Sheet 6

INVENTORS
JOHN B. CATALDO
ANDREW J. KRALIK
FRANK W. KUSSY
ROBERT W. THOMAS
BY
OSTROLENK, FABER, GERB and SOFFEN
ATTORNEYS Nov. 9, 1965   J. B. CATALDO ETAL   3,217,130
CIRCUIT INTERRUPTER CASING AND BASE
Filed July 27, 1962   9 Sheets-Sheet 7

INVENTORS
JOHN B. CATALDO
ANDREW J. KRALIK
FRANK W. KUSSY
ROBERT W. THOMAS
BY
OSTROLENK, FABER, GERB and SOFFEN
ATTORNEYS INVENTORS
JOHN B. CATALDO
ANDREW J. KRALIK
FRANK W. KUSSY
ROBERT W. THOMAS
BY
OSTROLENK, FABER, GERB and SOFFEN
ATTORNEYS

United States Patent Office 3,217,130
Patented Nov. 9, 1965

3,217,130
CIRCUIT INTERRUPTER CASING AND BASE
John B. Cataldo, Bloomfield Hills, Andrew J. Kralik, Detroit, Frank W. Kussy, Birmingham, and Robert W. Thomas, St. Clair Shores, Mich., assignors to I-T-E Circuit Breaker Company, Philadelphia, Pa., a corporation of Pennsylvania
Filed July 27, 1962, Ser. No. 212,890
6 Claims. (Cl. 200—168)

This invention relates to circuit interrupters and more particularly to circuit interrupters consisting of a novel vacuum switch and fuse assembly having a parallelogram linkage operating assembly for providing rapid, reliable contact opening and closing operations.

Double break switches of the prior art are comprised of a stationary contact pair having a reciprocating member slideably mounted therebetween. The reciprocating member consists of a conductive portion and an insulated portion wherein the conductive portion is positioned between the contact pair in the switch-closed position. The insulating portion moves to a position between the contact pair when the switch is operated to open circuit position. This arrangement thereby positions a member of high insulating value between the contact pair and further acts to prevent the accumulation of ionized gases in the region between the contact pair.

The instant invention provides a switch assembly which minimizes the effect of ionizing gases and inhibits arcing by means of a novel contact pair and reciprocating member configuration which together with a novel operating mechanism provides rapid and complete current interruption.

The switch assembly of the invention is comprised of an operating means having a toggle assembly which forms a parallelogram configuration having a stationary and a free end. The free end is coupled to the contact assembly reciprocating member. High speed movement of the reciprocating member is produced by an overcenter spring assembly positioned between a rotatable member and the toggle assembly.

Rotation of the rotatable member in a first direction moves the spring member to a first overcenter position causing the contact assembly to move rapidly to its closed position. Rotation of the rotatable member in the reverse direction moves the spring member to a second overcenter position rapidly moving the contact assembly to its open circuit position.

The contact pair is arranged so that one contact is relatively stationary and the second contact is relatively movable. A biasing member abuts the relatively movable contact providing high magnitude contact pressure in the contact assembly. The use of independent operating and contact pressure spring means enables the selection of spring means having dissimilar spring constants and further guarantees maintenance of contact pressure even if the operating spring means fails. The biasing spring mounting enables the contacts of the contact pair to be curved away from one another at their free ends each forming an arcing contact configuration to aid in the extinguishment of any electrical current arcs formed therebetween.

The contact arrangement described in the paragraph immediately above has the disadvantage that with the switch in the closed position the direction of current flow in one arm of the contact pair is opposite in direction to the current flow in the second arm of the contact pair. These two current paths generate magnetic fields which tend to oppose one another subsequently tending to drive the two contact arms of the contact assembly away from one another. Thus, substantially decreasing the contact engagement between the arms of the contact pair and the reciprocating metallic insert which is movable under control of the aforementioned toggle assembly. This arrangement thereby significantly alters the main current path. In order to overcome this undesirable feature, an alternative embodiment to the contact assembly has been provided which is comprised of first and second pairs each pair having a first and second contact arm which are positioned so as to receive and make firm engagement with opposing ends of the reciprocating metallic insert movable under control of the toggle assembly. The opposite ends of the first and second contact pairs are connected to the current path serviced by the switch assembly. With this arrangement and with the metallic insert in the closed position, i.e. with the metallic insert engaging both arms of both contact pairs, the current path extends through the contact assembly in such a manner that the direction of current flow through the first and second arms of each contact pair both extend in the same direction. This is likewise true of the direction of current flow in the first and second arms of the second contact pair. In this arrangement the contact arms of each contact pair generate magnetic fields which react with the associated arm of the contact pair in such a manner as to urge the contacts toward one another thereby increasing the contact engagement between the first and second arms of each contact pair and the reciprocating metallic insert.

The contact arms of each contact pair are further constructed so that the length of the size of each contact arm which faces its associated contact arm is substantially greater than the width of each contact arm. Thus with this arrangement, even though the first and second contact pairs are positioned in a substantially side-by-side arrangement, the physical configuration of the contact arms are such that they cannot undergo any bending whatsoever in the direction parallel to their faces so that the inherent strength and rigidity of each contact arm, due to its physical configuration is such that the arms of each contact pair may not be influenced to any degree by the inner acting magnetic fields between contact pairs. This arrangement thereby eliminates the occurrence of any contact "low open conditions," while taking full advantage of contact "low closed" conditions.

A retaining means is provided for restraining the free end of the toggle assembly during a portion of the closing operation. During this portion of the closing operation the overcenter spring means is charged to a degree sufficient to insure high speed closing. Closing cam means engageable with the rotating member initiates the movement of the toggle assembly and further cooperates to disengage the toggle assembly from the retaining means. Positive cam means are also provided which when engaged by the rotatable member acts to initiate movement of the toggle assembly in the opening direction. This structure assists the overcenter spring means in the opening operation and, in case of failure of the spring means or "welding" of the contact assembly, is designed to act as the sole means for moving the contact assembly to the fully open position.

In cases where circuit control for a multiphase system is desired, a unitary head is provided for mounting all of the reciprocating members. One end of the unitary head is coupled to the free end of the toggle assembly. The parallelogram arrangement of the toggle assembly assures uniform simultaneous movement of the plural contact assembly reciprocating members thereby preventing the occurrence of any single phasing. Since the toggle assembly experiences only translation and compression forces whereas prior art operating devices experience torsional forces during the closing and opening operations the instant invention insures simultaneous separation and engagement of the contact assemblies.

The switch housing is designed to compactly house the switch assembly. Guiding means are provided within the housing which cooperate with associated guide pins projecting from the unitary head for preventing the unitary switch head from experiencing any translational motion in directions transverse to the normal reciprocating motions.

Each switch assembly has a series connected fuse for each circuit to provide protection during overload or short circuit conditions. The fuse is mounted in mechanical parallel to its associated switch assembly providing a circuit interrupter assembly having extremely compact outside dimensions which are limited only by the dimensions of the fuses employed in the assembly. Openings are positioned along the housing adjacent each contact assembly for observation of the condition, i.e. open or closed position of the contact assembly. In installations where dust, humidity and other such objectionable environmental factors are present each opening may be fitted with transparent inserts to protect the switch assembly while retaining the observation feature.

The rotatable member is designed to operate under control of either a centrally mounted or a side mounted manual operating handle means thus enabling the circuit interrupter to be mounted in a variety of different positions.

It is therefore one object of this invention to provide a novel toggle assembly for a circuit interrupter.

Another object of this invention is to provide a circuit interrupter having a novel toggle assembly which includes novel restraining means enabling the toggle spring actuating means to become charged to a degree sufficient to provide high speed closing operations.

Another object of this invention is to provide a toggle assembly for a circuit interrupter which includes novel cam means for initiating circuit interrupter closing and opening operations.

Still another object of this invention is to provide a stationary contact assembly for circuit interrupters having biasing means completely independent from the circuit interrupter spring actuating means.

Another object of this invention is to provide a novel spring biased stationary contact assembly having stationary contact members which are curved at their free ends in directions away from one another to provide a novel arcing contact configuration.

Still another object of this invention is to provide a novel contact assembly for circuit interrupters of the multiphase type wherein a novel unitary head is employed for mounting the reciprocating members of each contact assembly to provide simultaneous uniform opening and closing operations.

Another object of this invention is to provide a housing for a circuit interrupter having novel means for mounting a switch assembly and associated series connected fuse means.

Another object of this invention is to provide a housing for a circuit interrupter having novel means for mounting a switch assembly and associated series connected fuse means wherein the series connected fuse means is mounted in mechanical parallel with its associated switch assembly.

Another object of this invention is to provide a novel toggle assembly operating means for a circuit interrupter which is arranged to accommodate either centrally or side mounted manual operating handles.

Still another object of this invention is to provide a movable contact arrangement for circuit interrupters having a unitary head means which is designed to cooperate with guide means provided in the interrupter housing to control the motion of the contact assembly reciprocating member.

Yet another object of this invention is to provide a movable contact arrangement for circuit interrupters having a reciprocating contact which is designed to cooperate with a contact assembly having a novel arrangement to enhance contact pressure between the reciprocating member and the cooperating contact assembly when the circuit interrupter is in its ON position.

Another object of this invention is to provide a toggle assembly operating means for circuit interrupters which is so designed as to experience no strain due to torsional forces during the opening and closing operations thereof.

These and other objects will become apparent upon reading the accompanying description and drawings in which.

Figure 20:
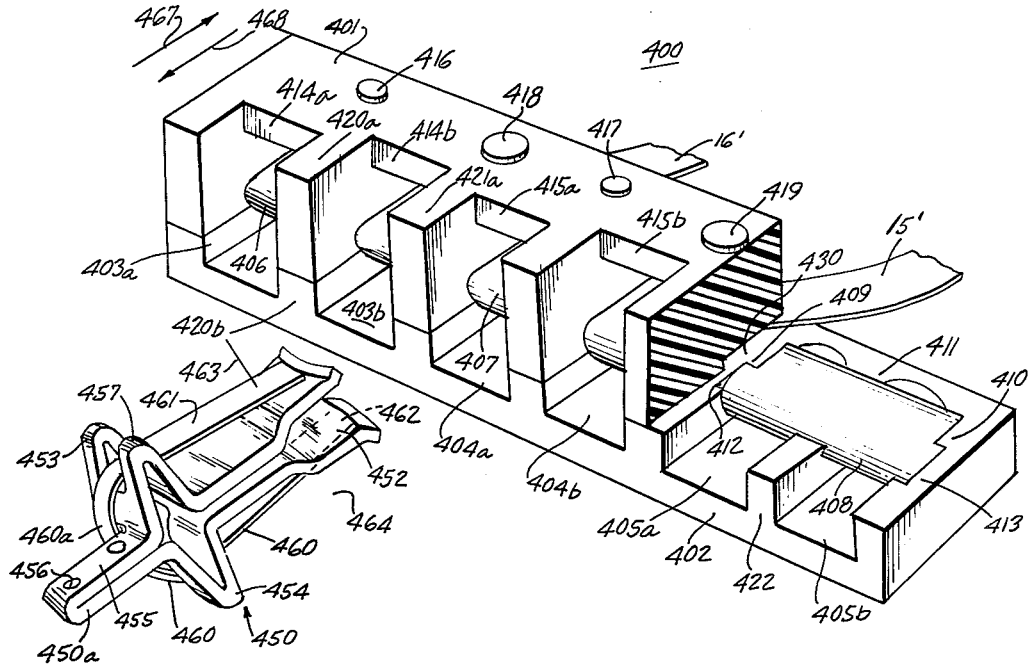
FIGURE 20 is a perspective view of an alternative embodiment for the unitary head of FIGURE 14 and which is used in conjunction with the contact pairs of FIGURE 19.
Figure 19:
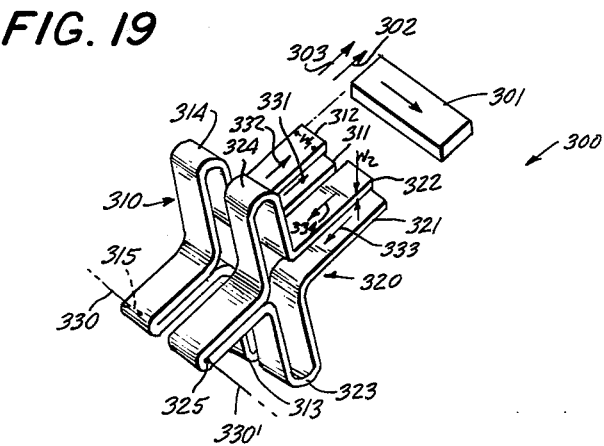
FIGURE 19 is a perspective view of an alternative embodiment for the contact assembly, as shown in FIGURE 13.

FIGURES 21a–21c and 22a–22c respectively, show two alternative embodiments for the contact structure shown in FIGURES 19 and 20, which provide a prealignment function for the contact structure in order to improve the contact structure operating characteristics.

Referring now to the drawings and more particularly to FIGURES 1–7, the toggle assembly 100 of this invention is comprised of first and second links 10 and 11 which are mounted to the circuit interrupter housing (not shown), at pivot points 12 and 13 respectively. The free ends of links 10 and 11 are pivotally connected to a crossarm link 14 at pivot points 17 and 18 respectively. A second pair of links 15 and 16 are also connected at their first ends to the pivot points 17 and 18 respectively. Their opposite ends are pivotally connected to a second crossbar member 19 at pivot points 20 and 21 respectively. The crossarm 19 is mounted in a manner to be more fully described, such that the movement of crossarm 19 is restricted to either the upward or downward vertical direction, as shown by arrows 21 and 22 respectively.

Rotatable arm 23 is provided and is mounted to pivot about reference point 24 in either the clockwise or counterclockwise directions as shown by the arrows 29 and 30. The opposite end 23a of arm 23 is coupled to the first end of operating spring member 25 which has its second end 25a coupled to a point intermediate the ends 17 and 18 of crossbar 14.

Figure 1:
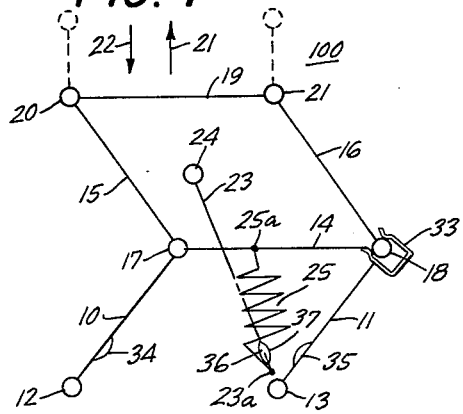
FIGURES 1 and 2 are schematic diagrams of the toggle assembly operating means of the instant invention showing the toggle assembly in the tripped position.
Figure 2:
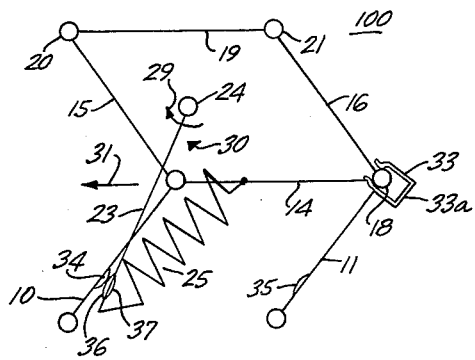

In order to move the crossarm 19 in the upward and downward vertical directions as shown by arrows 21 and 22 respectively the procedures are as follows:

Arm 23 is rotated (by means not shown) in the clockwise direction as shown by arrow 29 from the position shown in FIGURE 1 towards the position shown in FIGURE 2 causing the operating spring 25 to become charged. When the arm 23 has moved to the position shown in FIGURE 2 it makes slidable engagement with the link 10. The overcenter position of spring member 25 shown in FIGURE 2 causes the charged spring member 25 to urge the crossarm 14 in the direction shown by arrow 31. Thus the horizontal force component of the closing force generated by charged spring 25 moves the toggle assembly from the position shown in FIGURE 2 to that shown in FIGURE 3. Further movement in the direction of arrow 31 is restrained by the wall 32 which may for example be a portion of the circuit interrupter housing.

In order that the spring member 25 become charged to an amount sufficient to move crossarm 19 in the direction shown by arrow 21 at relatively high speeds, a restraining or clip means 33 is provided. The restraining means 33 is comprised of a substantially U-shaped member having arms which extend inwardly at their free ends and having its central portion 33a mounted in any well known manner so as to be stationary. The extending arms of restraining means 33 engage the pin 18 mounted at the end of crossarm 14 when the toggle assembly is in the position shown in FIGURE 1. Even though the spring means 25 becomes charged in moving from the position shown in FIGURE 1 to that shown in FIGURE 2 the engagement of pin 18 by restraining means 33 prevents the movement of the toggle assembly 100 to the position shown in FIGURE 3. In order to initiate movement of the toggle assembly the rotatable arm 23 slidably engages the arm 10 causing the pin 18 of crossarm 14 to be disengaged from restraining means 33. As soon as this occurs spring member 25 being in fully charged condition rapidly urges the toggle assembly toward the position shown in FIGURE 3. Thus, it can be seen that the restraining means 33 restrains the movement of the toggle assembly 100 for a period sufficient to fully charge spring member 25.

Closing cam means 34 mounted upon link 10 cooperate with closing cam 36 mounted upon rotatable arm 23 in order to initiate rotation of the link 10 and hence the entire toggle assembly 100 at the instant that spring means 25 achieves its fully charged condition.

Figure 3:
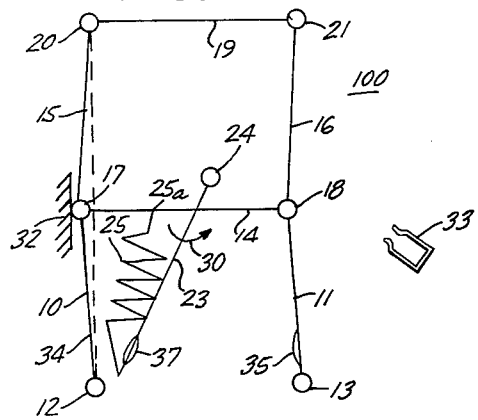
FIGURES 3 and 4 are schematic diagrams of the toggle assembly operating means of the instant invention showing the toggle assembly in the closed position.
Figure 4:
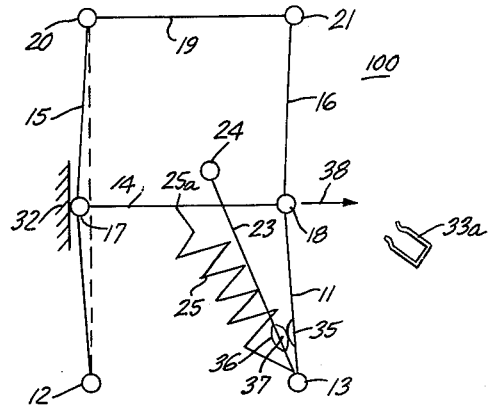

Operating toggle assembly from the position shown in FIGURE 3 to that shown in FIGURE 1 occurs as follows:

The rotatable arm 23 is moved counterclockwise as shown by arrow 30 towards the position shown in FIGURE 4. When the spring means 25 achieves the overcenter position shown in FIGURE 4 the horizontal force component of the total force exerted by spring means 25 upon crossarm 14 causes the crossarm 14 to move in the direction shown by arrow 38 until the toggle assembly assumes the position shown in FIGURE 1. It should be noted that the pin 18 becomes engaged by the restraining means 33 placing the toggle assembly in readiness for the next closing operation.

Initiating means for the opening operation is comprised of a tripping cam 35 mounted to link 11 and an associated tripping cam 37 mounted to arm 23 which cams are positioned so as to initiate the tripping operation at a time when spring means 25 is in the fully charged position. In addition thereto cam means 35 and 37 further enable toggle assembly 100 to be moved to the position shown in FIGURE 1 from that of FIGURE 4 under primary control of the manual force exerted by the operator upon rotatable arm 23. This may become necessary when the contact assembly has "welded" so that the tripping force of spring 25 alone is insufficient to break the weld and to move the contact assembly to the open position. Also in case of failure of operating spring member 25 due to breakage or for any other reasons the toggle assembly 100 may be moved to the fully open position solely by means of the tripping cams 35 and 37.

Figure 5:
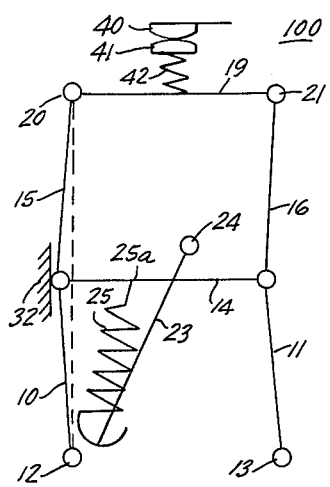
FIGURES 5 and 6 show the toggle assembly of FIGURES 1-4 employed for the actuation of two different contact assemblies.

The toggle assembly 100 may be cooperatively linked with a contact assembly such as for example the contact assembly of FIGURE 5 which is comprised of cooperating contacts 40 and 41. Contact 40 may for example be mounted in a stationary manner while contact 41 is resiliently mounted to crossarm 19 by means of spring member 42 positioned between crossarm 19 and contact 41. Thus it can be seen that when cooperating with the contact assembly of FIGURE 5 the position of the toggle assembly 100 shown in FIGURE 1 constitutes the fully open condition whereas the position shown in FIGURES 3 and 5 constitutes the fully closed position.

Figure 6:
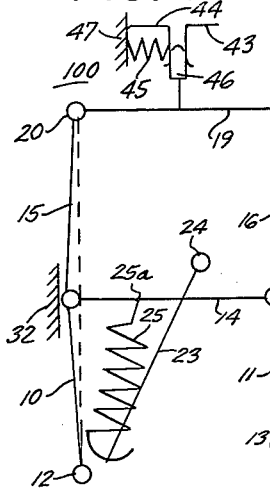

Another preferred embodiment of the contact assembly is shown in FIGURE 6 wherein the assembly is comprised of a stationary contact pair consisting of contacts 43 and 44. Contact 43 is mounted so as to be relatively stationary while contact 44 is mounted so as to be relatively movable. A biasing means 45 is positioned between contact 44 and a stationary reference point 47 urging contact 44 in a direction towards cooperating contact 43. A reciprocating contact 46 is provided which is linked at one end to a point intermediate the ends of crossarm 19 in such a manner that contacts 46 slidably engages the interior faces of contacts 43 and 44 when toggle assembly 100 is in the position shown in FIGURE 6 and is removed from between contacts 43 and 44 when the toggle assembly 100 is in the position shown in FIGURE 1 of the drawings. This contact assembly is far superior to the assembly of FIGURE 5 since there is no dependence upon the magnitude of the force exerted by operating spring 25 in order to maintain sufficient contact pressure between the surfaces of the contact members so as to provide a safe and continuous current flow therethrough.

With the toggle assembly in the position shown in FIGURE 6 it should be noted that maintenance of the fully closed position of the contact assembly and of adequate contact pressure of the contact surfaces therein is completely independent of spring member 25. For example, assuming that the spring member 25, with the toggle assembly positioned as shown in FIGURE 6, fails due to breakage or any other reason, the force exerted by spring member 45 is sufficient to maintain the contact assembly in the fully closed position and simultaneously therewith to provide adequate contact pressure. Also, this arrangement enables the spring members 25 and 45 to be chosen completely independent of one another since there is no inter-dependence or relationship between the forces which are required to be exerted by these spring members. Thus spring member 25 need only have a spring constant of a value sufficient to provide rapid operation of toggle assembly 100 while spring member 45 may be chosen to provide a much greater force to maintain adequate contact pressure for the contact assembly.

Figure 8:
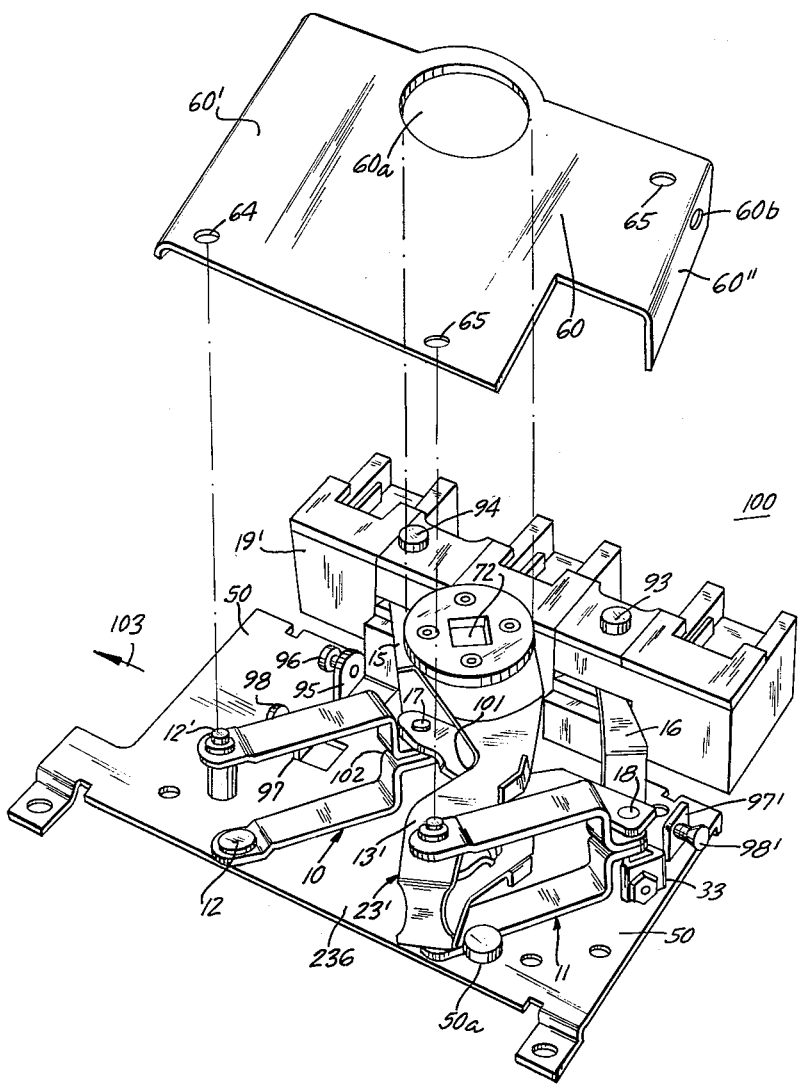
FIGURES 8 and 9 are perspective views of the toggle assembly of FIGURES 1-6 showing the toggle assembly in the fully tripped and fully closed positions respectively.
Figure 9:
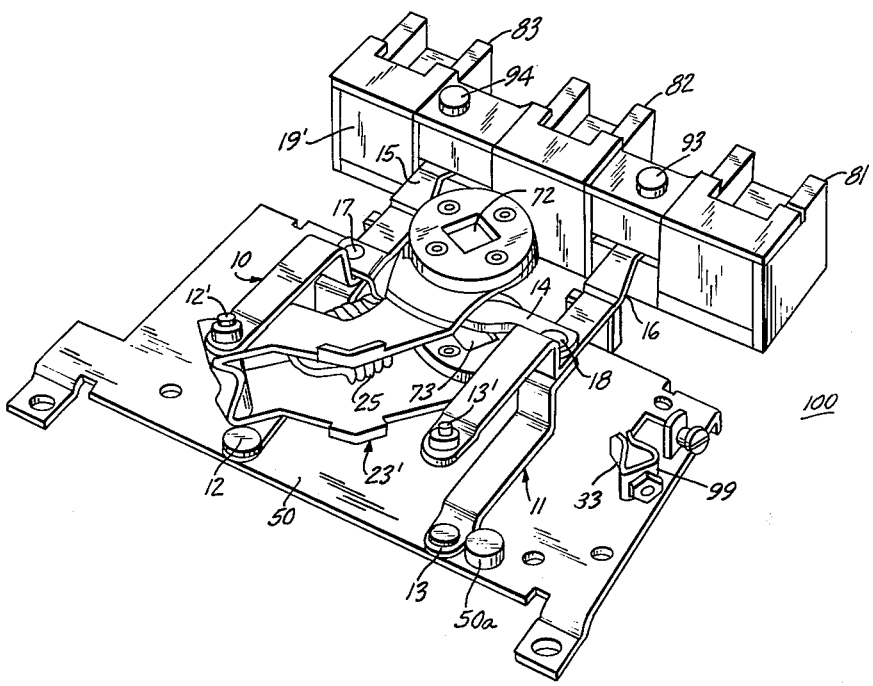

FIGURES 8 and 9 show the physical embodiment of the toggle assembly shown schematically in FIGURES 1–6 wherein like elements are identified by like reference numerals. The toggle assembly 100 shown therein is comprised of a back plate 50 having links 10 and 11 pivotally mounted thereto by pivot pins 12 and 13 respectively. The links 10 and 11 are substantially U-shaped members having their opposite ends linked by means of pins 17 and 18 to crossbar 14. Pins 17 and 18 also pivotally mount the first ends of the links 15 and 16 which links have their opposite ends connected to a cross member assembly 19' which is the equivalent of the crossarm 19 shown in FIGURES 1–6. The bottom plate 50 together with a top or covering plate 60 provide the housing enclosures for the operating mechanism. The upper arms of the links 10 and 11 are pivotally mounted by means of pins 12' and 13' which engage the apertures 64 and 65, respectively, of the top or cover plate 60.

The rotating member 23' of FIGURES 8 and 9 is the mechanical equivalent of the arm 23 shown in FIGURES 1–6. The arm 23' is a substantially U-shaped member having the free ends of its extending arms 69 and 70 substantially circular in configuration and having rectangular apertures 72 and 73, respectively, positioned adjacent the ends of arms 69 and 70. These apertures 72 and 73 are provided for receiving manual operating arms in a manner to be more fully described.

Arms 69 and 70 are provided with flanges 76 which are the mechanical equivalent of the opening cam 37 shown in FIGURES 1–4. These flanges are positioned so as to abut the upper and lower arms, respectively, of the link 11. The operation of the toggle assembly under the control of the operating spring 25 is identical to the operation of the toggle assembly shown schematically in FIGURES 1–6.

Figure 7:
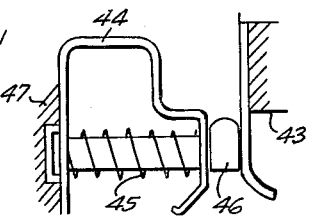
FIGURE 7 shows the contact structure of FIGURE 6 in greater detail.
Figure 13:
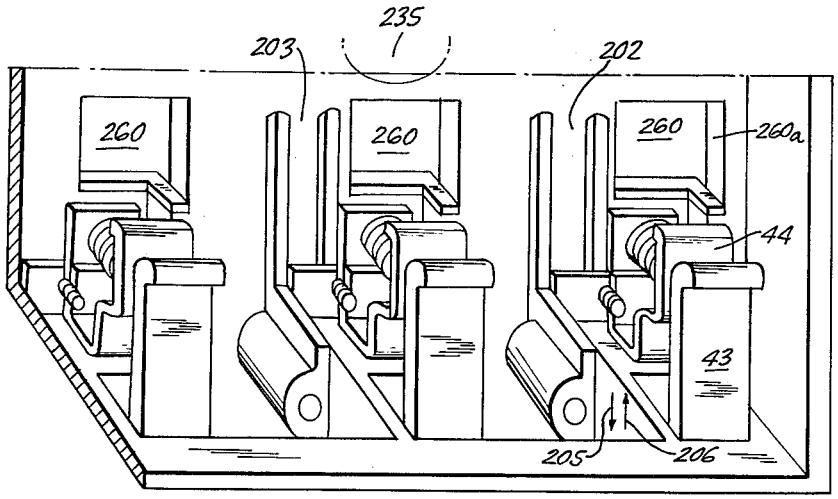
FIGURE 13 is a perspective view of an interior portion of the circuit interrupter of FIGURE 10 showing the stationary contact assembly in greater detail.

The stationary contact structure shown in FIGURE 13 is identical to the structure shown schematically in FIGURE 7 described previously. This contact structure cooperates with the unitary mounting head structure 19' which can best be seen in FIGURES 8, 9 and 14 and which is comprised of an elongated body 80 formed of an insulating material and having three extensions 81, 82 and 83 extending substantially perpendicular from the main body 80, each being formed integrally with the main body and each being formed of an insulating material. Each extension 81–83 is substantially rectangular and has a substantially rectangular cavity 84–86 respectively provided therein. A stationary insulating member 87, 88 and 89 is positioned in each cavity 84–86 respectively and is of such thickness as to be slidably engageable with the inner surfaces of the contact structure comprised of members 43 and 44 shown in FIGURE 13. Conductive members 90, 91 and 92 respectively are provided in the cavities 84–86 and are positioned so as to be substantially in alignment with their associated guide members 87–89 respectively. The conductive members 90–92 are positioned immediately behind their associated insulating means 87–89 respectively so that each insulating member such as member 87 is substantially in alignment with its associated conductive member, such as for example the conductive member 90. The mounting head 19' is provided with grooves (not shown) which are so dimensioned as to permit some movement of the conductive members 90–92 in a direction transverse to their longitudinal axis. This arrangement enables conductive members 90–92 to become properly aligned between its associated contact pair when moved to the fully closed position as will be more fully described.

Unitary mounting head 19' further includes guide pins 93 and 94 for the purpose of cooperating with associated grooves (not shown) in the circuit interrupter housing to restrain the unitary mounting head 19' from any movement other than the reciprocating movement as described with respect to FIGURES 1–6.

The back plate 50 of toggle assembly 100 is provided with a flange 95 having a tapped aperture for receiving a screw member 96. The screw member 96 acts as the fastening means for securing back plate 50 to cover plate 60. Screw member 96 threadedly engages a cooperating aperture (not shown) in flange 60'. Flange 60' acts as the stop means described with respect to FIGURES 1–6 and identified therein by numeral 32. A second and a third flange 97 and 97' each having an associated screw member 98 and 98' is provided for the very same purpose as screw member 96 so that with the toggle assembly 100 in its fully closed position, as shown in FIGURE 3 of the drawings, the right-hand end of screw member 96 threadedly engages an aperture in flange 60' and screw member 98' threadedly engages an aperture 60b in flange 60''.

A substantially U-shaped spring member 73 which can best be seen in FIGURES 8 and 9 is secured to base plate 50 so as to engage an extension of pin 18. The operation of this spring or retaining means is identical to that described in connection with FIGURES 1 and 2 in which the toggle assembly 100 is maintained in the position shown in FIGURES 1 and 2 until cam means 36 engages cam means 34. The concave portion 101 of rotary member 23' is the cammed portion employed during the closing operation which is arranged so as to engage the central portion or yoke 102 of arm 10. At the time engagement occurs between concave portion 101 and central portion 102 operating spring 25 has been charged to its maximum. Further rotation of arm 23' thereby pushes the toggle assembly in the direction shown by arrow 103 of FIGURE 8 causing the pin 18 to become disengaged from the restraining member 99. The energy stored in spring member 25 is then employed at this time for the purpose of driving the toggle assembly to its fully closed position as shown in FIGURES 3 and 9.

The circuit interrupter housing 200 can best be seen in FIGURES 10–13 and is comprised of a main shell 201 which is adapted to house the toggle assembly 100 shown in FIGURES 8 and 9. The toggle assembly is positioned in the housing shell 201 in such a manner that the pins 93 and 94 of the unitary mounting head (FIGURE 14) are guided by the elongated grooves 202 and 203 provided along the floor of housing shell 201 (FIGURE 13). With this arrangement the unitary mounting head 19' is in close proximity with the stationary contact structure comprised of contact members 43 and 44 which can best be seen in FIGURE 13. In this position the insulating members such as for example the insulating member 84 is positioned between the surfaces of contact members 43 and 44 when the toggle assembly is in the fully open position. When the toggle assembly is moved to the fully closed position the unitary mounting head 19' moves in a direction shown by arrow 205 relative to the stationary contact structure (see FIGURE 13) causing the conductive member such as for example the conductive member 90 to be positioned between the opposing faces of the contact members 43 and 44 in the manner shown in FIGURES 6 and 7. This provides a conductive path between the stationary contact members 43 and 44 which are connected to load and line terminals respectively in a manner to be more fully described.

When the toggle assembly is moved from the fully closed position to the fully open position the unitary head moves in the direction shown by arrow 206 relative to the stationary contact assembly causing the conductive member such as the conductive member 90 to become disengaged from the opposing surfaces of contact members 43 and 44. The insulating member 87 however, slides into a position directly between the opposing surface of contact members 43 and 44 so as to prevent the accumulation of ionized gases in the immediate region of the contact members 43 and 44 thereby preventing the occurrence of any restrike of the arc. The outwardly curved free ends of stationary contact members 43 and 44 act as arcing tips which become areas for an arc to travel when the switch is opened acting to stretch the length of the arc. This configuration substantially decreases burning in the portion where contact members are engaged by the conductive member 90 when the toggle assembly is in the fully closed position.

Upper surface 206 of housing assembly 200 (see FIGURE 10) is adapted to receive fuse holding assemblies which secure and electrically connect each fuse member with its associated double break contact structure. Since the structure for the fuse holding assembly is identical for each phase of the multiphase circuit interrupter only one such structure will be described. The fuse holding assembly is comprised of first and second fuse clips 207 and 208, respectively, which are secured to housing cover 206 by means of screw members 209 and 210. The fuse clip 209 is electrically connected to stationary contact member 44 which is secured to the upper surface 206 of the housing assembly by screw member 211. The conductive path therebetween consists of fuse clip 207, metallic member 212, and contact member 44. Metallic member 212 is positioned in a cavity 213 provided in the upper surface 206 of the housing assembly which cavity acts to prevent any movement of metallic member 212. Screw member 211 simultaneously acts to secure metallic member 212 within cavity 213 and to further maintain metallic member 212 in firm engagement with the upper portion of contact member 44. The screw member 209 acts to electrically and mechanically connect fuse clip 207 to metallic member 212. The contact member 43 is secured near the base of housing 206 by screw member 214 and has its right-handmost end (see FIGURE 15) in rigid engagement with the mounting terminal assembly 215. This assembly consists of a substantially rectangularly shaped member 216 (see also FIGURE 12) having a tapped screw member 217 for rigidly securing conductors positioned in the opening 218 formed by member 216 and screw member 217. A second screw member 218a is provided for rigidly securing rectangular member 216 to the right-handmost end of stationary contact 43 so as to provide good electrical connection therebetween. Thus the conductive path so far described (with the toggle assembly in its fully closed position) consists of the terminal means 215, stationary contact 43, conductive member 90, stationary contact 44, metallic member 212 and fuse clip 207.

The cooperating fuse clip 208 is secured by screw member 210 to an elongated metallic member 220. The screw member 210 acts to secure both the fuse clip 208 and the elongated metallic member 220 to the upper surface 206 of the housing assembly. The opposite end 220a of elongated metallic member 220 is positioned within the left-hand end of cavity 213 so as to prevent any movement thereof. A second terminal connector assembly 221 is provided which assembly is secured to a projecting ear portion 220b of elongated metallic member 220. This terminal assembly is identical in structure to the terminal assembly 215 and is comprised of a substantially rectangularly shaped member 222 having a tapped aperture for receiving screw member 223 employed for rigidly securing a conductor within the cavity 223 formed between the screw member 221 and the rectangularly shaped member 222 (see FIGURE 11). The fuse member is mounted between the associated fuse clips in the manner shown with respect to phases b and c in FIGURE 10 thereby establishing a conductive path between associated fuse clips such as for example the fuse clips 207 and 208. The entire conductive path through the circuit interrupter is therefore as follows:

Terminal means 215, stationary contact 43, metallic member 90, stationary contact 44, metallic member 212, fuse clip 207, fuse 229 (shown in FIGURE 15), fuse clip 208, conductive member 220 and terminal means 221. As can clearly be seen, this arrangement provides a conductive path through a series connected fuse and double break switch assembly which elements are physically arranged in mechanical parallel. This thereby provides an extremely compact circuit interrupter assembly.

Figure 11:
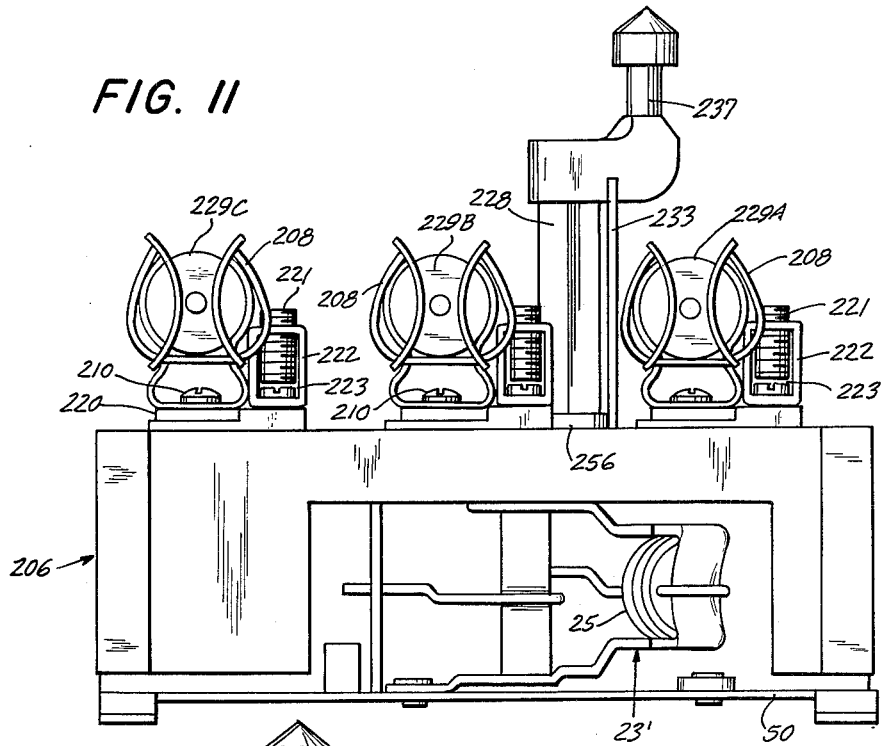
FIGURES 11 and 12 are end views of the opposing ends of the circuit interrupter of FIGURE 10.
Figure 12:
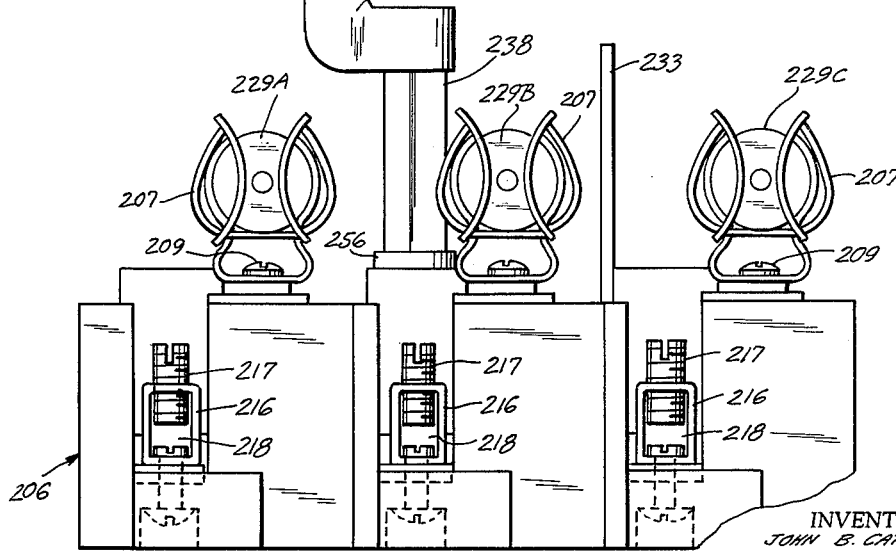

The elongated conductive member 220 is provided with a plurality of tapped apertures 231 along its length for the purpose of mounting the fuse clip 208 in a variety of positions so as to accommodate fuses of varying lengths. In order to isolate adjacent phases of the circuit interrupter assembly the housing assembly upper surface 206 is provided with elongated grooves such as for example the groove 232 for receiving an insulating barrier such as the insulating barrier 233 such as is shown in FIGURES 10–12.

Figure 10:
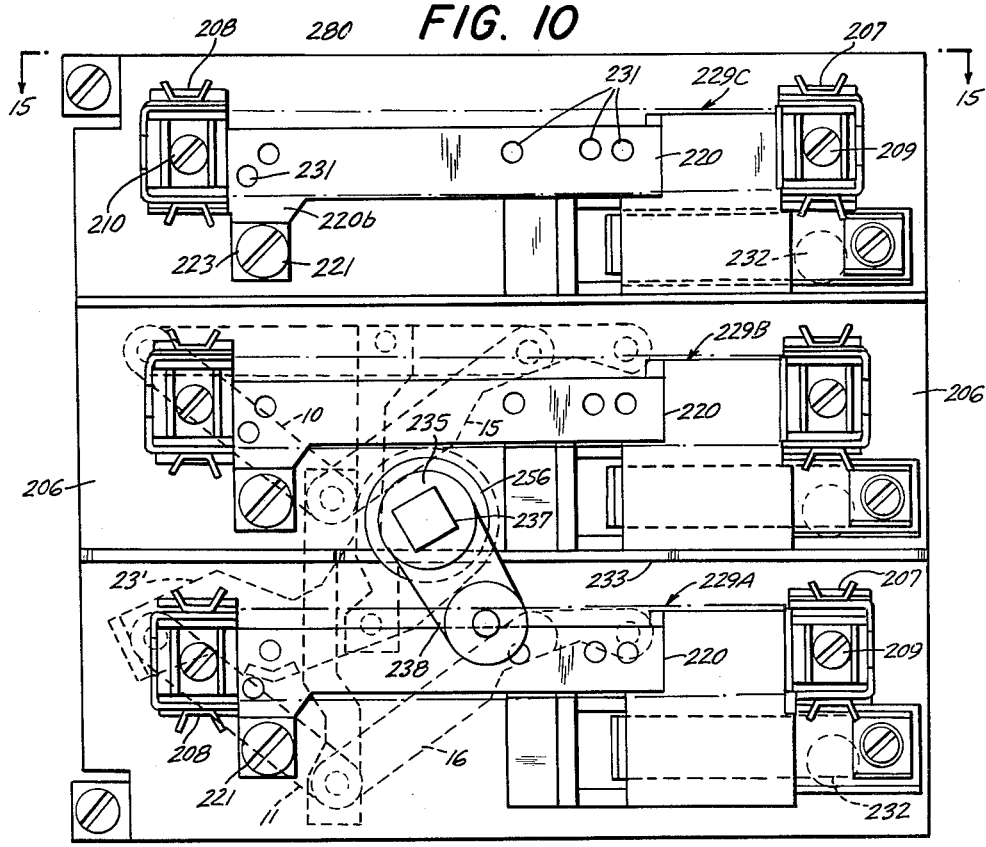
FIGURE 10 is a top plan view of the circuit interrupter of this invention.
Figure 15:
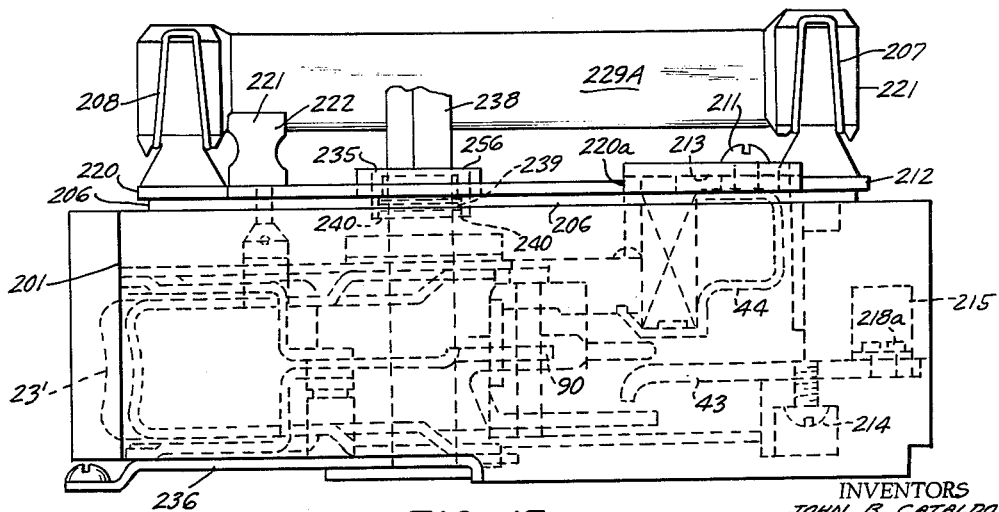
FIGURE 15 is a cross-sectional view of the interrupter assembly of FIGURE 10 taken along the line 15—15′.
Figure 16:
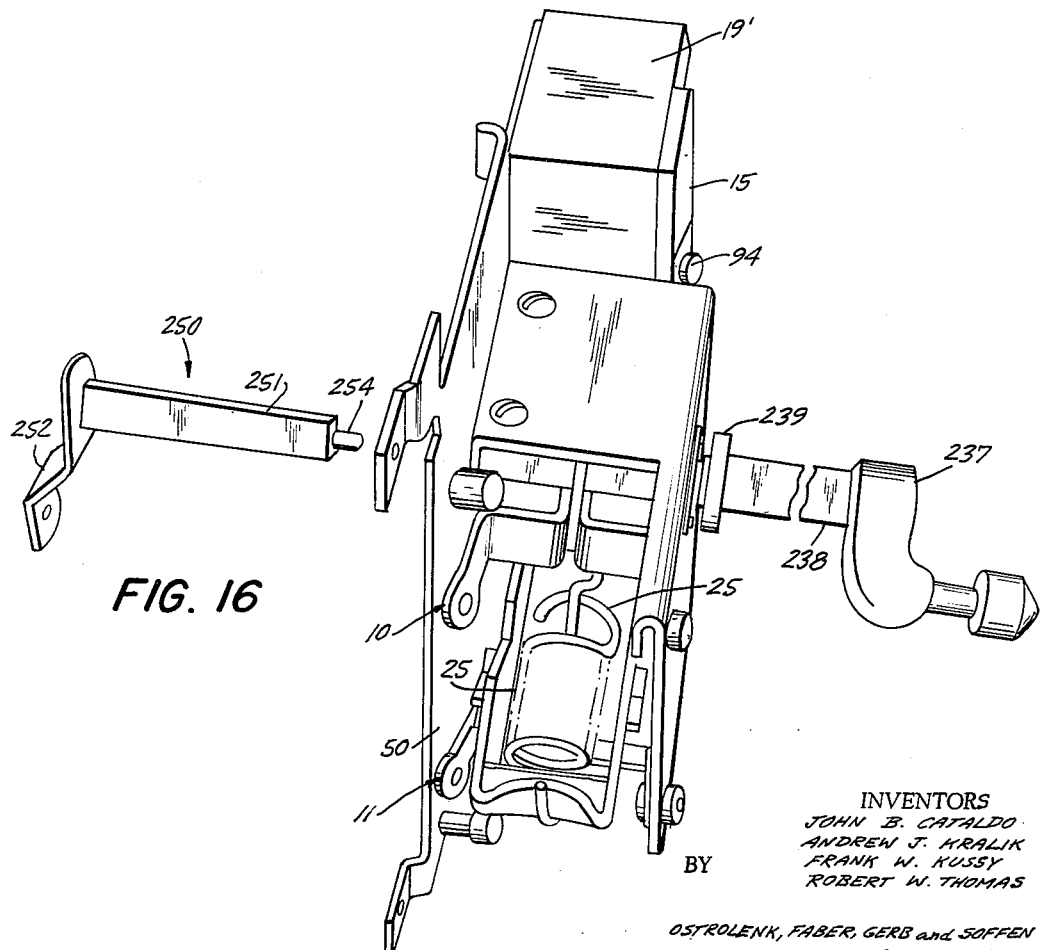
FIGURE 16 is an end view in perspective of the operating mechanism shown in FIGURES 8 and 9 showing the mounting of the alternative manual operating handles which may be employed with the circuit interrupter of this invention.
Figure 18:
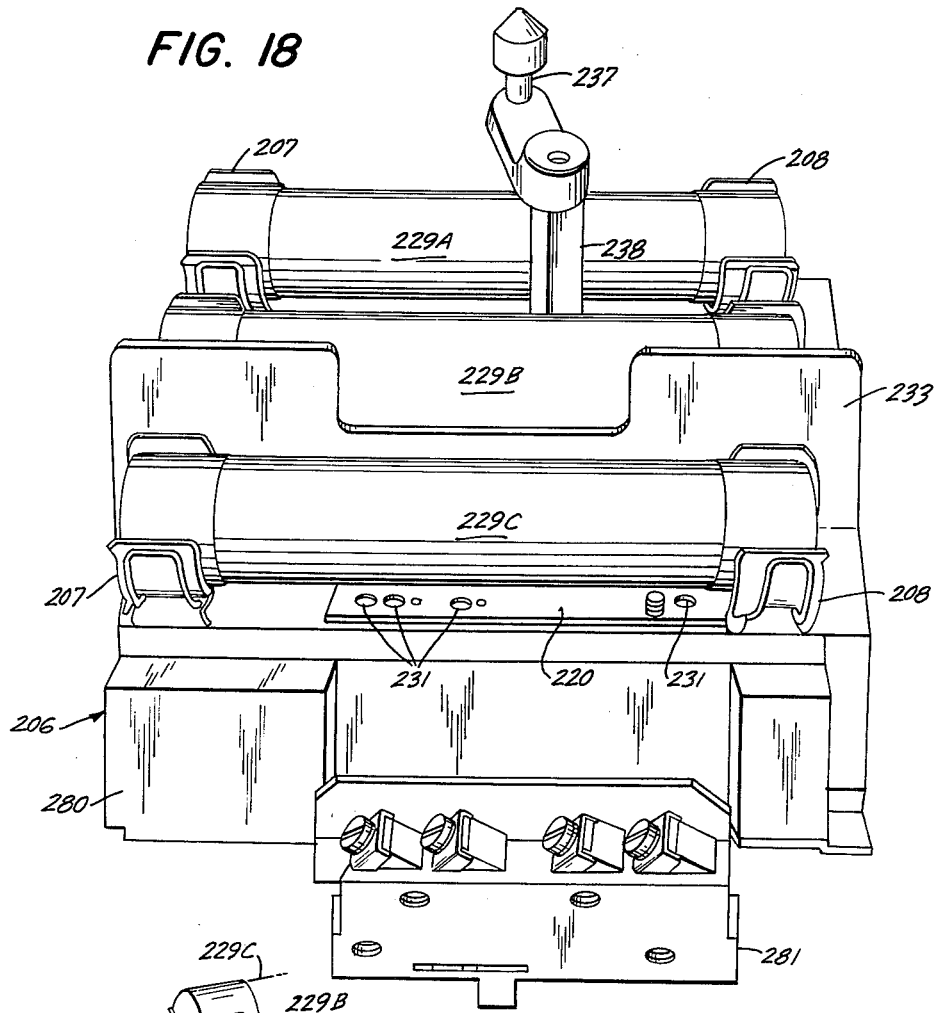
FIGURE 18 is a perspective view of a portion of the circuit interrupter of FIGURE 10 showing the manner in which the electrical interlock mounting is connected thereto.

Apertures 235 and 236 are provided in the upper and lower surfaces of the housing assembly which can best be seen in FIGURES 10 and 15. The upper aperture 235 provided in the housing upper surface 206 is adapted to receive the manual operating handle 237 shown in FIGURES 10–12. The operating handle portion 238 has a rectangular cross-section adapted to engage the substantially rectangular openings 72 and 73 provided in the rotary arm 23' of the toggle assembly 100 (see FIGURE 9). Thus, toggle assembly 100 may be operated to its closed and open positions by rotation of the manual operating handle 237 in the appropriate directions. The manual operating handle main portion 238 (see FIG. 16) is provided with a flange 239 surrounding its periphery which cooperates with a shoulder 240 provided adjacent the aperture 235 in housing top surface 206, thus facilitating the proper positioning of manual operating handle 237.

An alternative operating handle arrangement which may be employed is comprised of a handle assembly 250 having a body portion 251 and a rotating handle portion 252. The body portion 251 has a substantially rectangular cross-section which is adapted to engage the substantially rectangular apertures 72 and 73 of rotating member 23' which can best be seen in FIGURES 8 and 9. The length of the rotating handle portion is sufficient so as to extend to the side of the circuit interrupter assembly for ready access thereto. The main body portion 251 of side operated handle assembly 250 is held in position by means of a screw and washer which is mounted in the opening 235 of housing assembly upper surface 206 so that the bolt 256 rests on the shoulder 240 of opening 235 and is tapped so as to engage the screw portion 254 of main body portion 251. This arrangement therefore permits easily accessible side operation of the circuit interrupter assembly.

Openings 260 which can best be seen in FIGURES 10 and 13 are provided in the upper surface 206 of the housing assembly to permit direct observation of the contact assembly positioned immediately below each opening 260. In the fully closed position the contact members 43 and 44 are covered by the extending portions 81–83 of the unitary head means 19' (see FIGURE 14) and are therefore not visible at this time. When the toggle assembly is moved to the fully tripped position the contact members are observable in this position so as to permit a visual inspection for maintenance or other purposes. In situations where it is desired to cover the apertures 260 for protecting the circuit interrupter toggle assembly against dust, gases or other foreign matter, small insulating pieces having the same configuration as openings 60 may be snapped over the open areas and retained in this position by molded extensions 260a provided along the sides of each opening 260. If it is desired to prevent the introduction of such foreign matter while at the same time permitting observation of the contacts contained within the housing, the inserts employed may be formed of a transparent material.

Figure 17:
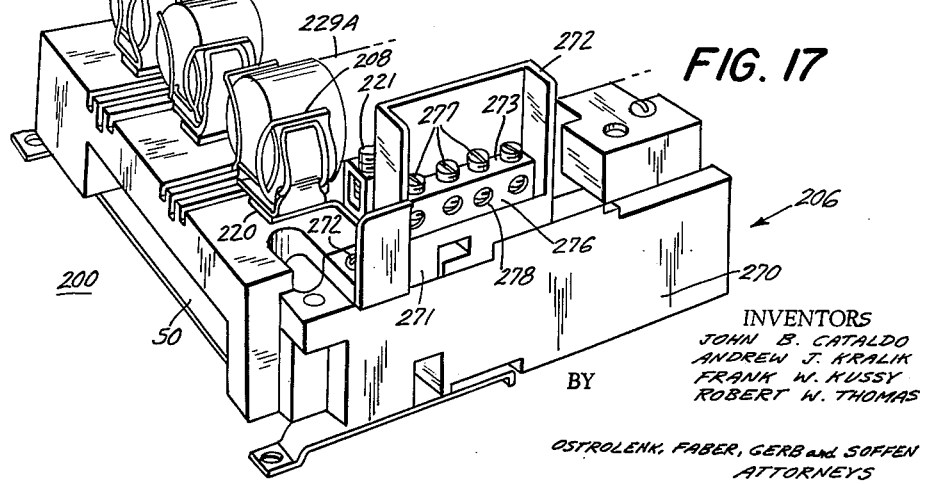
FIGURE 17 is a pespective view of a portion of the circuit interrupter assembly of FIGURE 10 showing the neutral assembly connected thereto.

In cases where the multiphase circuit interrupter of this invention is employed in circuitry requiring the provision of a neutral line the side wall 270 of housing assembly 200 which can best be seen in FIGURE 17 has a notched configuration 271 for receipt of a neutral mounting assembly 272 which is secured to the housing by fastening means such as the screw means 272'. The neutral terminal mounting means 272 is similar in structure to the terminal mounting means previously described and includes an elongated rectangularly shaped member 276 having a plurality of tapped apertures for receiving screw member 277. Openings 278 are provided adjacent each screw member 277 for receipt of a conductor lead. Provision of a configuration such as the notched configuration 271 in the housing assembly permits such a neutral device to be added right at the location where the circuit interrupter is to be used without the necessity of any additional drilling or other modification of the circuit interrupter at the time the neutral assembly is added to the circuit interrupter assembly. In addition, the configuration of the notched side wall 270 confines the neutral assembly when mounted thereto, to the existing overall interrupting switch dimensions so that no additional room is required for mounting of the circuit interrupter assembly. In a similar manner side wall 280 is notched in such a manner as to receive an electrical interlock assembly 281 which is operated under control of the circuit interrupter This arrangement also permits connection of the interlock assembly 281 without any increase in the circuit interrupter overall dimensions.

An alternative contact arrangement for cooperating with the reciprocally mounted unitary head 19', which can best be seen in FIGURE 19, consists of a contact structure 300 comprised of first and second contact pairs 310 and 320 designed to receive the reciprocally mounted metallic member 301 which is mounted so as to reciprocate in the directions as shown by arrows 302 and 303 under control of the toggle mechanism as was previously described. As both contact pairs 310 and 320 are identical in structure and function, only one will be described. The contact pair 310 has first and second arms 311 and 312, which are constructed so as to bend outwardly at positions 313 and 314, which are spaced from the upper ends of contact arms 311 and 312. Arms 311 and 312 bend inwardly and join together to form a substantially U-shaped portion 315 which is connected to a conductor 330 in any suitable manner. It should be understood that arms 321 and 322 of contact pair 320 are identical to arms 311 and 312 of contact pair 310. The U-shaped portion (not shown) of contact pair 320 is connected in a like manner to a conductor 330'. With this arrangement the conductors 330 and 330' are connected in any suitable manner to the circuit being serviced by the contact arrangement 300. When the switch is in the closed or ON position the conductance member 301 moves vertically downward, as shown by arrow 302 so that its opposing faces make firm physical contact with the associated surfaces of the arms 311, 312, and 321, 322 of the contact pairs 310 and 320 respectively. In this position, the current path extends from conductor 330 upward and in the same direction through both arms 311 and 312 across metallic member 301 and down both arms 321 and 322 of contact pair 320 to conductor 330'. Arrows 331 and 332 show the direction of current flow through arms 311 and 312 while arrows 333 and 334 show the direction of current flow through the arms 321 and 322 of contact pair 320. Considering first contact pair 310, it can be appreciated that the current represented by arrows 331 and 332 generate magnetic fields which react with one another. It is well known that with the current directions 331 and 332 being the same, the magnetic fields react in such a manner as to urge contact arms 311 and 312 towards one another. This causes both arms 311 and 312 to make firm engagement with the metallic member 301. In a like manner it can be seen that currents 333 and 334 both flowing in the same direction cause contact arms 321 and 322 to make firm engagement with metallic member 301 in much the same manner so that with the switch assembly in the closed or ON position a satisfactory current path is maintained so long as a current is present and with no necessity for providing biasing means to insure adequate contact pressure between the cooperating elements of the contact assembly 300.

As can clearly be seen from FIGURE 19, the width W1 of each contact arm is substantially greater than the width W2 of the contact arm so that even though the currents 331 and 333 may react to urge the contact members towards separation, the physical configuration of the contact arms substantially prevents any bending whatsoever in this direction so that any "blow open" forces generating by these opposing direction currents is completely defeated by the physical configuration of the arms of the contact pairs.

It can therefore be seen that this invention provides a novel circuit interrupter assembly having a toggle assembly of parallelogram configuration which insures rapid uniform closing and opening operations and which is further designed so that the series connected fuse associated with each double break contact assembly of the multiphase circuit interrupter is positioned in mechanical parallel with its associated contact assembly to provide a compact structure. While the preferred embodiment described herein is a multiphase circuit interrupter assembly, it should be understood that this invention operates equally as well with a greater or lesser number of phases and it is therefore not intended that the scope of the claims be limited to the preferred embodiment described above.

FIGURE 20 is a perspective view of a unitary head 400 which is employed with the contact pairs of the form shown in FIGURE 19. The unitary head 400 is comprised of upper and lower molded members 401 and 402, respectively, which have been connected so as to form the unitary head, shown in FIGURE 20, having six cavities or openings 403a–405a and 403b–405b, which cavities have been designed to position and secure the contact slugs 406, 407 and 408 in a manner to be more fully described.

The slugs, such as for example, slug 406 is mounted in a position substantially intermediate the top and bottom surfaces of the unitary head 400 such that the left-hand side of the contact slug 406 is adapted to receive one contact pair such as, for example, the contact pair 450 of FIGURE 19, while the right-hand side of slug 406 is adapted to receive a second contact pair (not shown) in cavity 403b wherein the two contact pairs are of the type shown in the complete assembly of FIGURE 19. It should be noted that contact pairs, such as for example, the contact pair 450, are all mounted in a stationary manner, while the movable head 400 undergoes reciprocating movement in the directions shown by arrows 467 and 468 in the same manner as the unitary head shown in FIGURES 8 and 9. Thus, when the head 400 is moved in the direction shown by arrow 468, the contact surfaces 451 and 452 of the contact assembly 450 engage the left-hand side of contact slug 406. When the head 400 is moved in the direction shown by arrow 467 the contact pair 450 is disengaged from the left-hand side of slug 406 and assumes the position substantially as shown in FIGURE 20. The projections 420a and 420b of the upper and lower members 401 and 402 respectively provide insulation between the two contact pairs associated therewith so that when the unitary head 400 is moved out of engagement with its cooperating contact pairs the projecting portions 420a and 420b act to prevent any arcing between the contact pairs during the separation thereof.

A portion of the upper molded member 401 has been broken away in order to show more clearly the structure of the cavities 405a and 405b. As can be seen in FIGURE 20, lower molded member 402 is provided with depressions 409 and 410 for receiving the projections 412 and 413 respectively of the contact slug 408. A depression 411 is provided in the projection 422 for receiving the central portion of contact slug 408. The upper molded member 401 is provided with like depressions (not shown) which cooperate with the depressions 409, 410 and 411 to position and secure all of the contact slugs 406–408 when the upper and lower members are suitably fastened by fastening means 416 and 417.

Figure 14:
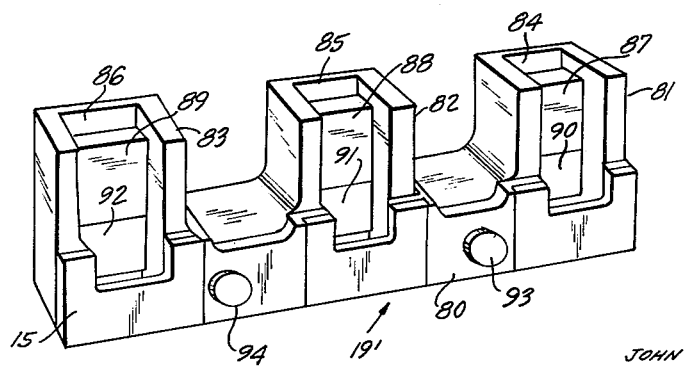
FIGURE 14 is an enlarged perspective view of the unitary head structure of FIGURES 8 and 9.

The molded head 400 of FIGURE 20 is moved in a manner similar to the molded head shown in FIGURES 8, 9 and 14, by means of links 15' and 16' which are substantially identical to the connecting links 15 and 16, shown in FIGURE 9, for example. These links 15' and 16' are pivoted about pivoting pins 419 and 418 respectively, which are employed in much the same manner as the pins 93 and 94 of FIGURE 9 to act as a pivotal means for the links 15' and 16' and to further act as a guide means and are adapted to move within the grooves provided in the switch casing for limiting the movement of the unitary head along a straight line (i.e., preventing any movement transverse to the directions shown by arrows 467 and 468). Suitable depressions, such as the depression 430 are provided for enabling the connecting links 15' and 16' to rotate the desired amount about their pivot pins 419 and 418 respectively.

As can be noted, the top molded member 401 has been notched along its front edge immediately above each cavity forming the notches 414a–416a and 414b–416b. It will be noted that the notches 414b–416b are deeper than their associated notches 414a–416a respectively. The notches 414 are provided for the purpose of inspecting the contact slugs 406–408 in the following manner: With the unitary head in the position, as shown in FIGURE 20 (i.e., disengaged from the contact pairs 450), all of the contact slugs 406–408 may be observed in the cavities 403a–405a and 403b–405b. The observation is made through the openings 260 in the breaker casing, as shown in FIGURE 13.

With the unitary head 14 in a position whereby the contact surfaces 451 and 452 of the contact pair 450 firmly engages its associated contact slug the depressed notches 414b–416b permit observation of the engagement between the contact slugs and the contact surfaces 451 and 452 of the stationary contact pair 450.

In order to provide adequate contact pressure, a jaw spring 460 is provided on each contact pair in the manner shown in FIGURE 20. The extending portions 453 and 454 of the contact assembly 450 are provided with slots such as a slot 457 for receiving the jaw spring 460, such that the yoke portion 60a of spring 460 is positioned a predetermined distance away from and to one side of the yoke portion 450a of the contact pair 450 and further such that the free ends 461 and 462 of spring 460 engage the contact pair 450 at a position near the contact surfaces 451 and 452, which free ends are urged in the directions shown by arrows 463 and 464 in order to provide suitable contact pressure.

It should be noted that the contact assemblies from the curved extending portions 453 and 454 back to the yoke portion 450 are substantially wider than the remaining portion of the contact pairs in order to provide for apertures 456 which are arranged in the contact pair assembly adjacent the spring member 460 for the purpose of positioning and securing the contact member to suitable terminal means. The curved portions 453 and 454 are provided in order to guarantee that each contact pair assembly 450 has sufficient resiliency. It should be understood that the operation of the switch using the unitary head and contact pair structure of FIGURE 20 is substantially identical to that described previously with the added features of the unique blow-on paths for insuring contact pressure when the switch is in its ON position.

Figure 21A:
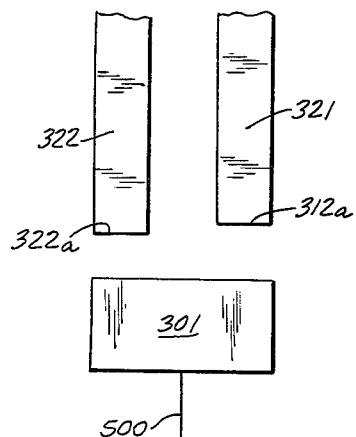
Figure 21B:
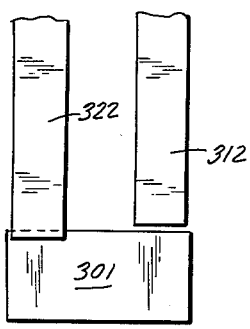
Figure 21C:
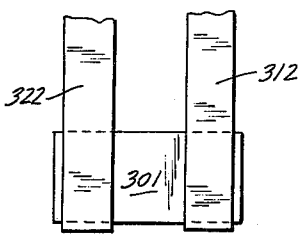

FIGURE 21 shows an alternative arrangement for the contact structure shown in FIGURES 19 and 20 in order to provide the contact structure with improved operating characteristics. FIG. 21a shows the arms 312 and 322 and the conductive slug 301 of the contact assembly 300 of FIGURE 19. However, arm 322 has been modified so as to extend further in the direction of slug 301 such that the front edge 322a of arm 322 lies closer to slug 301 than front edge 312a of arm 312. The contact assembly, modified in this manner, operates as follows:

As the slug 301 moves in the direction shown by arrow 500, from the position of FIGURE 21a to the position of FIGURE 21b, the left-hand edge of slug 301 is engaged by arm 322 at a time prior to engagement of the right-hand edge of slug 301 by arm 312 of the contact assembly. This causes slug 301 to be guided appropriately into alignment with the cooperating contact structure such that the front edge 322a of arm 322 operates as an aligning means. Once the slug 301 is suitably aligned it moves to the fully ON position as shown in FIGURE 21c. This alignment feature allows the switch to be closed faster than switches without this feature and further eliminates any bouncing effects of the contacts and minimizes arcing on one side of the moving contact 301, all of which features act to increase the ability of the switch to interrupt or withstand higher interrupting currents.

Figure 22A:
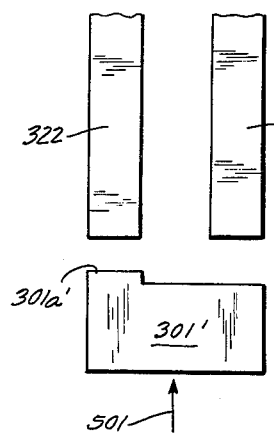
Figure 22B:
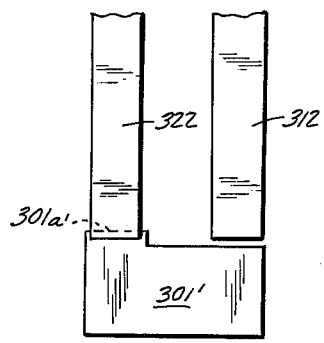
Figure 22C:
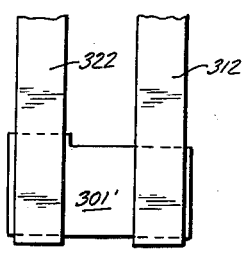

An alternative way of obtaining this advantageous feature is shown in FIGURES 22a–22c, wherein the conductive slug 301' is provided with a forwardly projecting portion 301a'. The operation is such that portion 301a' in moving in the direction of arrow 501 from the position of FIGURE 22a to the position of FIGURE 22b causes the arm 322 to engage slug projection 301a' prior to the engagement of slug 301' by arm 312. This arrangement provides the same alignment feature set forth above with regard to FIGURES 21a–21c. In the fully ON condition the slug 301' occupies the position shown in FIGURE 22c thus providing the same advantageous features obtained with the arrangement shown in FIGURE 21.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A reciprocating assembly for use with a multi-phase circuit interrupter wherein each phase is comprised of a stationary contact pair and controlled by a circuit interrupter operating mechanism comprising an insulating body portion, first means contained within said body portion for coupling said assembly to an operating mechanism; a projecting portion extending in a direction substantially perpendicular to said body portion, said projecting portion having a cavity of a configuration adaptable to position the ends of said stationary contact pair facing said projection portion substantially within at least the opening of said cavity; an insulating member mounted within said cavity adjacent the opening thereof and positioned to slideably engage the opposing faces of said contact pair; a conductive member mounted within said cavity behind said insulating member and positioned to slideably engage the opposing faces of said contact pair when said circuit interrupter is moved to its closed position.

2. A reciprocating assembly for use with a multi-phase circuit interrupter wherein each phase is comprised of a stationary contact pair and controlled by a circuit interrupter operating mechanism comprising an insulating body portion, first means contained within said body portion for coupling said assembly to an operating mechanism; a projecting portion extending in a direction substantially perpendicular to said body portion, said projecting portion having a cavity of a configuration adaptable to position the ends of said stationary contact pair facing said projection portion substantially within at least the opening of said cavity; an insulating member mounted within said cavity adjacent the opening thereof and positioned to slideably engage the opposing faces of said contact pair; a conductive member mounted within said cavity behind said insulating member and positioned to slideably engage the opposing faces of said contact pair when said circuit interrupter is moved to its closed position; said conductive member being resiliently mounted at the end adjacent said insulating member to permit self alignment of said conductive member with said contact pair to provide a sufficient conductive path therebetween.

3. A reciprocating assembly for use with a multi-phase circuit interrupter wherein each phase is comprised of a stationary contact pair and controlled by a circuit interrupter operating mechanism comprising an insulating body portion, first means contained within said body portion for coupling said assembly to an operating mechanism; a plurality of projecting portions each associated with one phase of said multiphase breaker, each projecting portion extending in a direction substantially perpendicular to said body portion, said projecting portion having a cavity of a configuration adaptable to position the ends of said stationary contact pair facing said projection portion substantially within at least the opening of said cavity; an insulating member mounted within said cavity adjacent the opening thereof and positioned to slideably engage the opposing faces of said contact pair; a conductive member mounted within said cavity behind said insulating member and positioned to slideably engage the opposing faces of said contact pair when said circuit interrupter is moved to its closed position.

4. A reciprocating assembly for use with a multiphase circuit interrupter wherein each phase is comprised of a stationary contact pair and controlled by a circuit interrupter operating mechanism comprising an insulating body portion, first means contained within said body portion for coupling said assembly to an operating mechanism; a plurality of projecting portions each associated with one phase of said multiphase breaker, each projecting portion extending in a direction substantially perpendicular to said body portion, said projecting portion having a cavity of a configuration adaptable to position the ends of said stationary contact pair facing said projection portion substantially within at least the opening of said cavity; an insulating member mounted within said cavity adjacent the opening thereof and positioned to slideably engage the opposing faces of said contact pair; a conductive member mounted within said cavity behind said insulating member and positioned to slideably engage the opposing faces of said contact pair when said circuit interrupter is moved to its closed position; said conductive member being resiliently mounted at the end adjacent said insulating member to permit self alignment of said conductive member with said contact pair to provide a sufficient conductive path therebetween.

5. A reciprocating assembly for use with a multiphase circuit interrupter wherein each phase is comprised of a stationary contact pair and controlled in a circuit interrupter operating mechanism comprising an insulating body portion, first means contained within said body portion for coupling said assembly to an operating mechanism; a plurality of projecting portions each associated with one phase of said multiphase breaker, each projecting portion extending in a direction substantially perpendicular to said body portion, said projecting portion having a cavity of a configuration adaptable to position the ends of said stationary contact pair facing said projection portion substantially within at least the opening of said cavity; an insulating member mounted within said cavity adjacent the opening thereof and positioned to slideably engage the opposing faces of said contact pair; a conductive member mounted within said cavity behind said insulating member and positioned to slideably engage the opposing faces of said contact pair when said circuit interrupter is moved to its closed position; said conductive member being resiliently mounted at the end adjacent said insulating member to permit self alignment of said conductive member with said contact pair to provide a sufficient conductive path therebetween; a housing for said circuit interrupter; said housing having a plurality of apertures; each aperture being positioned adjacent an associated contact pair and adapted to permit observation of said contact pair when said circuit interrupter is in the tripped position and to prevent observation of said contact pair when said circuit interrupter is in the closed position so as to permit observation thereof only when each contact pair is fully deenergized.

6. A reciprocating assembly for use with a multiphase circuit interrupter wherein each phase is comprised of a stationary contact pair and controlled by a circuit interrupter operating mechanism comprising an insulating body portion, first means contained within said body portion for coupling said assembly to an operating mechanism; a plurality of projecting portions each associated with one phase of said multiphase breaker, each projecting portion extending in a direction substantially perpendicular to said body portion, said projecting portion having a cavity of a configuration adaptable to position the ends of said stationary contact pair facing said projection portion substantially within at least the opening of said cavity; an insulating member mounted within said cavity adjacent the opening thereof and positioned to slideably engage the opposing faces of said contact pair; a conductive member mounted within said cavity behind said insulating member and positioned to slideably engage the opposing faces of said contact pair when said circuit interrupter is moved to its closed position; said conductive member being resiliently mounted at the end adjacent said insulating member to permit self alignment of said conductive member with said contact pair to provide a sufficient conductive path therebetween; a housing for said circuit interrupter; said housing having a plurality of apertures; each aperture being positioned adjacent an associated contact pair and adapted to permit observation of said contact pair when said circuit interrupter is in the tripped position and to prevent observation of said contact pair when said circuit interrupter is in the closed position so as to permit observation thereof only when each contact pair is fully deenergized; a plurality of transparent inserts associated with each of said housing apertures to permit observation of said contact pairs while excluding foreign matter from said housing interior.

References Cited by the Examiner
UNITED STATES PATENTS

| | | | |
|---|---|---|---|
| 2,849,572 | 8/58 | Cellerini et al. | 200—114 |
| 2,921,169 | 1/60 | Judd et al. | 200—153 |
| 3,003,046 | 10/61 | De Torre | 200—18 |
| 3,073,936 | 1/63 | Baird | 200—168 |
| 3,094,598 | 6/63 | Lindell | 200—114 |
| 3,105,132 | 9/63 | Jencks | 200—168 |

KATHLEEN H. CLAFFY, *Primary Examiner.*

ROBERT K. SCHAEFER, *Examiner.*